United States Patent [19]
Powell

[11] 3,807,350
[45] Apr. 30, 1974

[54] GEAR BAND SELECTOR TACHOMETER

[75] Inventor: Patrick L. Powell, Franklin Park, Ill.

[73] Assignee: Steward-Warner Corporation, Chicago, Ill.

[22] Filed: Oct. 20, 1972

[21] Appl. No.: 299,430

[52] U.S. Cl. ............ 116/129 R, 73/432 A, 116/116
[51] Int. Cl. .............................................. G09f 9/00
[58] Field of Search ............. 116/57, 116, 129, 133; 73/432 A; 324/115

[56] References Cited
UNITED STATES PATENTS

| | | | |
|---|---|---|---|
| 2,501,033 | 3/1950 | Denison | 116/129 R |
| 2,798,454 | 7/1957 | Gleeson | 116/133 |
| 2,879,940 | 3/1959 | Cornell | 116/116 X |
| 3,276,418 | 10/1966 | Harris | 116/116 |
| 3,446,178 | 5/1969 | St. Clair et al. | 116/116 |
| 3,469,559 | 9/1969 | Mullet | 116/129 R |

*Primary Examiner*—Louis J. Capozi
*Attorney, Agent, or Firm*—Augustus G. Douvas; Norton Lesser

[57] ABSTRACT

The following specification describes a speedometer dial assembly including a stationary front plate having a plurality of windows through which selected speed and gear indicia carried on a rotatable rear plate are seen. The rear plate has a shaft extending through the front plate for enabling manual rotation of the rear plate to align the appropriate indicia with the windows and a plurality of spaced recesses on one plate engage correspondingly shaped detents on the other plate to enable alignment of the indicia without visual examination. In addition, the front plate has indicia indicating engine speed and both plates have a window enabling meter dials to be read.

10 Claims, 6 Drawing Figures

PATENTED APR 30 1974

GEAR BAND SELECTOR TACHOMETER

BACKGROUND OF THE INVENTION

1. Field of the Invention

This invention relates in general to instrument dials and more particularly to a simplified vehicle instrument dial for indicating the speed of a vehicle operated through a plurality of speed ranges.

2. Description of the Prior Art

Off-the-road vehicles are generally provided with an instrument that utilizes a tachometer mechanism to indicate vehicle speed by means of a dial marked with a large number of speed ranges, corresponding gear numbers and the engine speed. In addition, an odometer or hour meter for measuring hours of engine operation to determine the need for maintenance or rental charges is seen in the same instrument.

Generally eight speed ranges are marked on the instrument dial in four concentric bands of different colors with four speed ranges indicated in the upper half of the dial and four indicated on the lower half of the dial by diametrically opposite ends of the pointer marked "high" or "low," respectively, so that a confusing array of colors and indicia are presented to the operator when he views the dial for determining which band and half of the dial he should select. The appropriate gear numbers are marked along each band between the two dial halves in yet another background color so the operator must shift his gaze to see them and yet another background color is provided for the tachometer or engine speed indicia in the center of the dial. The result is not a confusing array of numbers and colors, but also a problem of distinguishing indicia from the background.

SUMMARY OF THE INVENTION

The present invention provides apparatus for simplifying the presentation of speed and other indicia to the vehicle operator by providing a front or outer dial plate having a plurality of openings therein through which only a selected small portion of the speed and gear indicia is seen. The speed and gear indicia is marked on a rear or inner plate which is rotatable relative the front plate, and the speed indicia for the high and low range are marked in concentric circles each divided into four guadrants with the gear indicia marked in a concentric circle midway between the ends of each quadrant. The inner plate is rotated by means of a knob on a shaft extending through the instrument lens and a unique economical indexing arrangement comprising an integrally formed detent and recess in the respective front and rear plates permits the operator to determine both by feel and noise the registration of each speed range and gear with the respective window. This arrangement permits the outer or stationary dial plate to be marked in its lower half with the engine speed and with simplified background color.

It is therefore an object of the present invention to provide an improved and more economical dial arrangement for a multi-range instrument.

Other objects and features of the present invention will become apparent on examination of the following specification and claims together with the drawings.

DESCRIPTION OF THE PREFERRED EMBODIMENT

Figure 1:
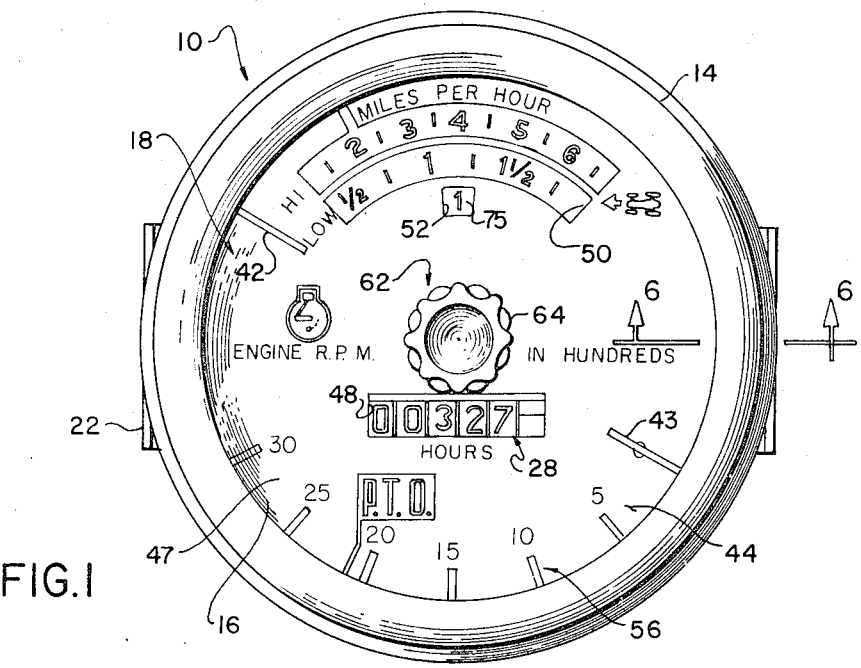
FIG. 1 is a front elevational view of a combined speedometer, tachometer and hour meter instrument incorporating the principles of the present invention.
Figure 2:
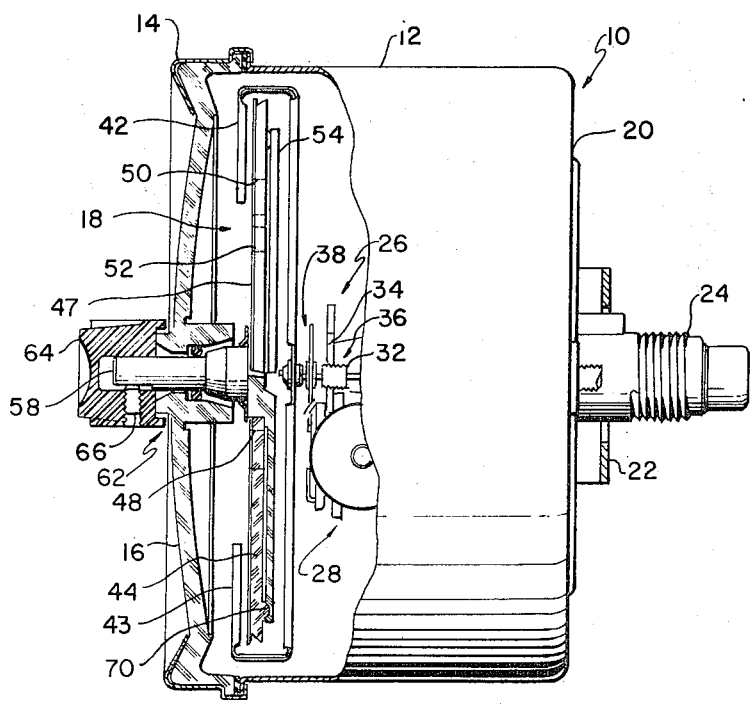
FIG. 2 is a side elevational view of the instrument shown in FIG. 1 with the housing partially broken away to illustrate the dial assembly.
Figure 3:
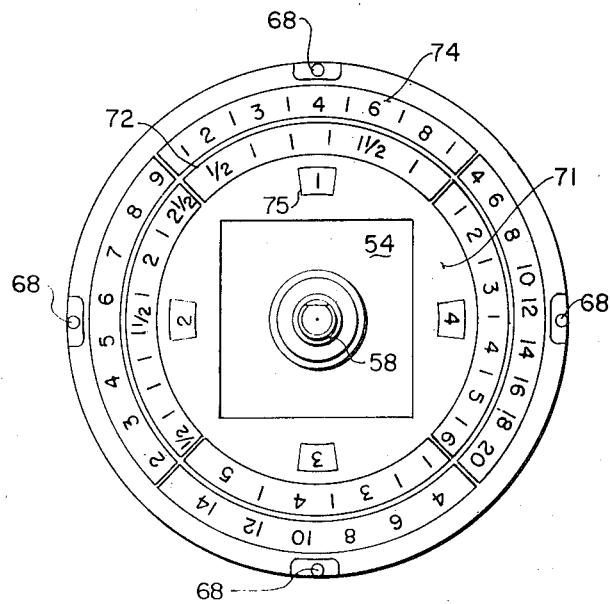
FIG. 3 is a front elevational view of the rear dial plate.
Figure 4:
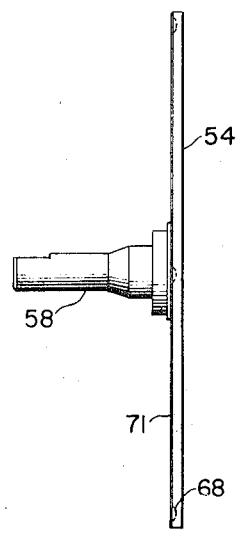
FIG. 4 is a side elevational view of the rear dial plate.

In FIGS. 1 and 2 of the drawings, an instrument embodying the principles of the present invention is indicated by the reference character 10. The instrument 10 comprises a cup-shaped housing 12 having an open end to which a bezel 14 is attached for securing a transparent plastic plate or lens 16 over the open end and through which a plate assembly 18 is viewed. The housing 12 has a back wall 20 which carries a conventional U-shaped bracket 22 for mounting the instrument 10 on the dashboard of a tractor, for example.

Figure 5:
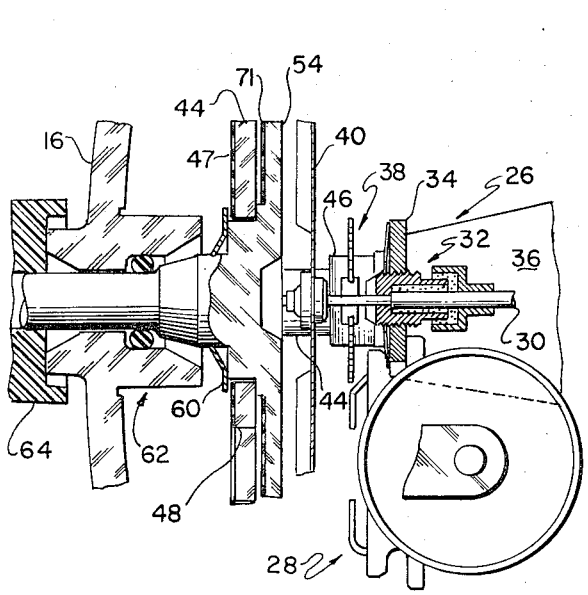
FIG. 5 is an enlarged fragmentary view of the central portion of the plate assembly.

A threaded boss 24 formed on the back wall of a conventional U-shaped bracket carrying a conventional tachometer or speedometer mechanism in instrument 10 extends through back wall 20 to receive a nut for attaching a flexible shaft casing carrying a rotatable flexible shaft. The flexible shaft drives the conventional tachometer mechanism, a portion of which is indicated at 26 in housing 12 together with an hour meter 28. The mechanism 26 includes a pointer shaft 30 best seen in FIG. 5, having one end extending through a bearing assembly 32 secured in a bracket 34 extending between arms 36 of the U-shaped bracket from which the boss 24 projects. A torsion spring assembly 38 biases the pointer shaft to a zero or home position and the projecting one end of shaft 30 has a pointer or indicator 40 secured thereto. The pointer or indicator 40 is secured behind the dial plate assembly 18 and the ends of the pointer extend past the periphery of the dial plate assembly 18 at diametrically opposite ends, and each pointer end is provided with a U-shaped bend overlapping the plate assembly 18 with each bend having a respective leg 42 and 43 in front of the plate assembly 18 where each leg 42 and 43 is visible through lens 16.

Figure 6:
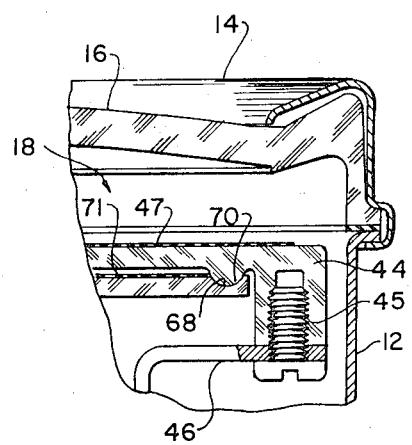
FIG. 6 is an enlarged fragmentary view of the peripheral portion of the plate assembly.

The plate assembly 18 comprises a front or outer stationary plate 44 having rearwardly projecting spaced bosses 45 adjacent the plate periphery to fasten the plate to bracket arms such as 46, seen in FIG. 6. The bracket arms 46 extend from the U-shaped bracket supportig the tachometer mechanism. The dial plate 44 may be transparent and is covered with an opaque layer 47, which has openings registering with openings in plate 44, or forming windows 48, 50 and 52 in plate 44 for enabling viewing of the dials of the odometer or hour meter 28, together with the speed and gear indicia carried on a rear or inner dial plate 54. Indicia 56 corresponding to engine speed are marked on the layer 47 of plate 44 adjacent the lower half of the plate periphery for cooperation with pointer leg 43. The layer 47 is marked with high and low indicia for respective speed ranges adjacent opening 50, in addition to contrasting backgrounds for the upper and lower halves, and carries such legends as are helpful in locating data.

The second or rear plate 54 is transparent to permit the hour meter or odometer dials to be viewed through window 48 in plate 44. A control shaft 58, seen best in FIGS. 2, 3, 4 and 5, is secured to plate 54 coaxial with the shaft 30. Shaft 58 passes rotatably through plate 44 along the central axis, and a member 60 holds the plates against relative axial movement. Shaft 54 is journalled in lens 16 by a bearing assembly 62 and the shaft end protruding from the assembly 62 is provided with a flat surface to facilitate the fastening of a knob 64 thereto by means of a set screw 66.

A plurality of spaced recesses 68 are provided in the periphery of plate 54 with each recess located in a respective quadrant of the plate for engaging any one of four rounded detents 70 integrally formed at corresponding circumferential and radial positions to hold the rear plate 54 stationary relative front plate 44 unless the rear plate is rotated. The rear plate 54 is rotated manually by simply grasping the knob 64 and rotating the same to rotate the edge of each recess 68 against the engaged detent 70, which flexes or cams the periphery of plate 54 away from plate 44 to permit its facile rotation, until the recesses 68 are aligned with the succeeding detents 70, at which time the spring pressure in the flexed periphery of plate 54 snaps the recesses into engagement with the aligned detent. When the detents engage or disengage from the recesses, both a noise and a vibration is created so that the operator can either or both hear or feel the indexing of plate 54 from one position to another.

Plate 54 is also provided with an overlay 71 having indicia indicating speeds in each of two concentric circumferential circular areas 72 and 74 located radially in registration with opening 50, and spaced gear number indicia 75 located radially in registration with opening 52. The overlay 71 does not cover the central portion of plate 54 to leave the lower meter 28 visible. Each circular area 72 and 74 is provided with a background contrasting with the background of the upper half of overlay 47 so that the numbers thereon are easily visible, and each is separated into four quadrants corresponding to different speed ranges with the outer area corresponding to a group of high speed ranges and the inner area corresponding to a group of low speed ranges, as marked in radially corresponding positions on overlay 47. The indicia in band 72 indicates speed in ranges of substantially ½ to 1 ½; ½ to 2 ½; 1 to 5; and 2 to 6 MPH, respectively in successive quadrants, and the outer band 74 indicates speed ranges of substantially 2 to 8; 2 to 9; 4 to 14 and 4 to 20 MPH in successive quadrants. The gear indicia 75 correspond to a respective one of four gears for the low range or high range, respectively, to provide a total indication of the eight gears available for the type of vehicle described. The indicia 72, 74 and 75 are, of course, spaced so that any time the detents 70 are engaged in recesses 68, a full speed range is displayed in window 50 and the gear indicia in window 52.

When the vehicle engine is operated and the vehicle is in a standing position, the tachometer indicator or pointer swings clockwise, as seen in FIG., to a position leg 43 along indicia 56 corresponding to engine speed. The operator rotates the knob 64 and plate 54 until the lowest range of speeds in the low range band 72 are visible in window 50, together with the desired gear range, at which time the detents 70 are in registry with recesses 68 to hold the plates in the selected position- Thevehicle is position. The vehicle placed in gear and moved. The engine speed alters under load while the operator supplies fuel to maintain or alter the engine speed and both engine and the corresponding vehicle speed are indicated by the respective positions of legs 42 and 43 of the needle.

As the vehicle picks up speed, the operator shifts or rotates the knob 64 to bring a second range of speed indicia to window 50 and corresponding gear indicia into window 52 and shifts gears accordingly. In this, or like, manner the vehicle is operated through the entire ranges of speeds in bands 72 and 74. The vehicle speed is noted by observing the position of leg 42 relative the indicia in the quadrant of bands 72 or 74 visible in window 50, and when appropriate, the knob 64 rotated and the gears shifted accordingly. The operator thus easily notes the vehicle speed and gear position since only two ranges and one gear are visible at any one time, and he takes appropriate action in accordance with any one of the eight speed ranges. It will be noted that the operator need only select from the two speed ranges seen in window 50 and that the operator, in moving from one range to another, need not necessarily look at the dial since he is provided with a tactile and/or aural indication of a change in the position of plate 54 each time the detents engage or disengage the recesses.

The foregoing is a description of an improved instrument dial assembly whose inventive concepts are believed set forth in the accompanying claims and foregoing specification.

What is claimed is:

1. An instrument dial assembly for use with an instrument having a pointer rotated to an angular position corresponding to a condition registered by said instrument, the improvement comprising a cup-shaped housing having an open end for carrying said instrument, an inner plate carrying indicia arranged in a circular band divided into segments extending over respective angular portions of said plate, a lens covering said open end and secured to said housing, means for rotatably supporting said plate in said housing between said lens and instrument and for manually rotating said plate from a position external to said housing, an outer plate between said inner plate and said lens for obscuring said band with said outer plate having a window located radially at a position corresponding to said band from the axis of rotation of said inner plate whereby each segment of said indicia is viewed sequentially through said window in response to rotation of said inner plate, means on said pointer overlapping said plates and located between said outer plate and said lens for movement past said window to a position along said indicia viewed through said window for indicating the condition registered by said instrument, and means for providing a tactile signal of the rotation of said inner plate through an angle corresponding to one of said segments.

2. The assembly claimed in claim 1 in which said means for providing a tactile signal comprises a plurality of circumferentially spaced recesses in one of said plates, and a detent on the other of said plates for engaging any one of said recesses with said detent, flexing said one plate in response to rotation of said inner plate to disengage said detent from a recess and permitting release of the flexing stress in response to the alignment of said detent with any of said recesses.

3. An instrument dial assembly for use with a tachometer drive by a vehicle engine and having a pointer mounted on a pointer shaft rotated to an angular position corresponding to the speed of said engine, the improvement comprising a cup-shaped housing having an open end and carrying said tachometer, an inner plate having vehicle speed indicia arranged in concentric circular bands adjacent the periphery of said plate with each band being divided into segments corresponding to respective speed ranges and extending over equal angular portions of said plate, a transparent lens secured to said housing for covering said open end, means including a shaft rotatably supporting said plate for rotation about an axis coaxial with said pointer shaft with said shaft extending through said lens for enabling manual rotation of said plate, an opaque outer plate between said inner plate and said lens, a first window in said outer plate located radially of said axis at a position corresponding to said bands and extending over an arc corresponding to said angular portions to permit viewing indicia in each range aligned with said window, indicia representing engine speed on said outer plate at a position diametrically opposite said window, means carried by said pointer between said outer plate and said lens at diametrically opposite positions for movement by said pointer past said window to a position along said speed indicia visible through said window and along said outer plate engine speed indicia respectively for indicating vehicle and engine speed respectively, and means for indexing said inner plate through each said angular portion relative said outer plate in response to rotation of said inner plate.

4. The dial assembly claimed in claim 3 in which said indexing means comprises a plurality of recesses in one of said plates spaced circumferentially at positions corresponding to said angular portions, and a detent on the other plate arranged to engage in any one of said recesses.

5. The dial assembly claimed in claim 3 in which said indexing means comprises a plurality of recesses in said inner plate spaced circumferentially at positions corresponding to said angular portions, and a plurality of detents on said outer plate equal in number to said recesses and circumferentially spaced for engaging in any one of said recesses, said plates spaced for flexure of said inner plate by said detents in response to disengagement of said detents from said recesses by rotation of said inner plate and relieving said flexure in response to alignment of said detents with said recesses to thereby provide a tactile indication of the alignment of any of said segments with said window.

6. In the dial assembly claimed in claim 5, a second window in said outer plate located radially inwardly of said first window and indicia corresponding to a gear number spaced intermediate the ends of each angular portion for registering with said second window in response to the alignment of a respective segment with said first window.

7. In the dial assembly claimed in claim 6, a third window in said outer plate, and a window in said inner plate for displaying indicia of an odometer located in said housing.

8. The dial assembly claimed in claim 7 in which said outer plate provided with one background color adjacent said window for contrasting with the background color of said segments and a second background color adjacent said engine speed indicia.

9. An instrument dial assembly for use with a tachometer driven by a vehicle engine and having a pointer mounted on a pointer shaft rotated to an angular position corresponding to the speed of said engine, the improvement comprising a cup-shaped housing having an open end and carrying said tachometer, an inner plate having vehicle speed indicia with one background color arranged in concentric circular bands adjacent the periphery of said plate with each band being divided into segments corresponding to respective speed ranges and extending over equal angular portions of said plate, a transparent lens secured to said housing for covering said open end, means including a shaft rotatably supporting said plate for rotation about an axis coaxial with said pointer shaft with said shaft extending through said lens for enabling manual rotation of said plate, an opaque outer plate between said inner plate and said lens and having a window located radially of said axis at a position corresponding to said bands and extending over an arc corresponding to said angular positions to permit viewing indicia in each range aligned with said window, indicia representing engine speed on said plate at a position diametrically opposite said window, a second background color on said outer plate adjacent said window and differing from the speed indicia one background color, a third background color on said outer plate adjacent said engine speed indicia and differing from said second color, and means carried by said pointer between said outer plate and said lens at diametrically opposite positions for movement by said pointer past said window to a position along said indicia visible through said window and said outer plate engine speed indicia respectively for indicating vehicle and engine speed respectively, 10. The assembly claimed in claim 9 in which said means carried by said pointer comprises a respective leg at diametrically opposite end of said pointer overlapping each of said plates, and a radially inwardly leg terminating each respective leg located between said lens and outer plate.

* * * * *